(12) United States Patent
Weisshaupt et al.

(10) Patent No.: US 11,074,088 B2
(45) Date of Patent: Jul. 27, 2021

(54) SYSTEM AND METHOD OF UTILIZING SECURITY DEVICE PLUGIN FOR EXTERNAL DEVICE MONITORING AND CONTROL IN A SECURED ENVIRONMENT

(71) Applicant: Barracuda Networks, Inc., Campbell, CA (US)

(72) Inventors: Martin Weisshaupt, Innsbruck (AT); Reinhard Staudacher, Innsbruck (AT); Christoph Rauchegger, Innsbruck (AT)

(73) Assignee: Barracuda Networks, Inc., Campbell, CA (US)

( * ) Notice: Subject to any disclaimer, the term of this patent is extended or adjusted under 35 U.S.C. 154(b) by 375 days.

(21) Appl. No.: 16/268,264

(22) Filed: Feb. 5, 2019

(65) Prior Publication Data
US 2020/0183709 A1    Jun. 11, 2020

Related U.S. Application Data

(60) Provisional application No. 62/777,021, filed on Dec. 7, 2018.

(51) Int. Cl.
*G06F 9/445* (2018.01)
*H04L 29/06* (2006.01)
*H04L 29/08* (2006.01)

(52) U.S. Cl.
CPC .......... *G06F 9/44526* (2013.01); *H04L 63/02* (2013.01); *H04L 63/0428* (2013.01);
(Continued)

(58) Field of Classification Search
CPC ....... H04L 63/20; H04L 63/02; H04L 67/141; H04L 63/1408; H04L 63/10;
(Continued)

(56) References Cited

U.S. PATENT DOCUMENTS 9,680,875 B2 * 6/2017 Knjazihhin ......... H04L 41/0843
9,692,784 B1    6/2017 Nenov
(Continued)

OTHER PUBLICATIONS

Midi et al., "Kalis—A System for Knowledge-Driven Adaptable Intrusion Detection for the Internet of Things", 2017 IEEE 37th International Conference on Distributed Computing Systems (ICDCS), Date of Conference: Jun. 5-8, 2017.

*Primary Examiner* — El Hadji M Sall (57) ABSTRACT

A new approach is proposed that contemplates systems and methods to support utilizing security device plugins for external device control and monitoring in a secured environment. A plugin that implements one or more functionalities to communicate with and to control operations of an external device is provided to a network security device/appliance. The plugin is then loaded to the network security appliance and integrated with a software running on the network security device, wherein the software obtains the functionalities offered by the plugin. A communication link is established between the plugin of the network security device and the external device following a communication protocol. The network security device is then configured to issue/receive one or more commands to/from the external device following the communication protocol to monitor and collect information from and/or control or be controlled by the external device remotely.

31 Claims, 8 Drawing Sheets

(52) U.S. Cl.
CPC .......... *H04L 63/10* (2013.01); *H04L 63/1408* (2013.01); *H04L 63/20* (2013.01); *H04L 67/141* (2013.01)

(58) Field of Classification Search
CPC ............. H04L 63/0428; H04L 43/0817; H04L 41/0813; H04L 41/046; H04L 67/125
See application file for complete search history.

(56) References Cited

U.S. PATENT DOCUMENTS

| | | |
|---|---|---|
| 10,594,734 B1 | 3/2020 | Rappard et al. |
| 10,742,674 B1 | 8/2020 | McLinden et al. |
| 2007/0192867 A1* | 8/2007 | Miliefsky ............... H04L 63/20 726/25 |
| 2013/0268357 A1* | 10/2013 | Heath .................... G06Q 30/02 705/14.53 |
| 2015/0067866 A1* | 3/2015 | Ibatullin ............. H04L 63/1466 726/25 |
| 2015/0244585 A1* | 8/2015 | Birk ........................ H04L 63/10 726/23 |
| 2017/0034023 A1* | 2/2017 | Nickolov ............ H04L 43/0817 |
| 2017/0155703 A1 | 6/2017 | Hao et al. |
| 2018/0007058 A1 | 1/2018 | Zou et al. |
| 2018/0287869 A1 | 10/2018 | Munafo et al. |
| 2018/0375887 A1 | 12/2018 | Dezent et al. |
| 2019/0380037 A1 | 12/2019 | Lifshitz et al. |

* cited by examiner

SYSTEM AND METHOD OF UTILIZING SECURITY DEVICE PLUGIN FOR EXTERNAL DEVICE MONITORING AND CONTROL IN A SECURED ENVIRONMENT

CROSS-REFERENCE TO RELATED APPLICATIONS

This application claims the benefit of U.S. Provisional Patent Application No. 62/777,021, filed Dec. 7, 2018, and entitled "System and method of security device plugin for external device control and monitoring in a secure environment," which is incorporated herein in its entirety by reference.

BACKGROUND

Information technology (IT)/network security devices/appliances, such as firewalls, are hardware or computing devices combined with specialized software running on the hardware located at important checkpoint(s) of a network of a company or organization and are dedicated to protecting the IT systems and devices of the company from unauthorized access originated from outside network. Traditionally, the protected systems and devices can be, for non-limiting examples, conventional computers such as desktops, laptops, and server machines, and communication devices such as mobile devices used by employees of the company.

A plugin is a small software, which implements certain functionality independently in order to make such functionality available for another software. When a main software running on a device or appliance loads the plugin at some point during its operation, the main software gains the functionality implemented in the plugin. Plugins therefore allow the creation of modular systems, which can be customized and tailored for their specific use cases.

With the rapid progress of digitalization of technology, companies are increasingly seeking to control, not just conventional/standard computing and communication devices, but also various types of external devices, which include but are not limited to network-enabled Internet of things (IoT) devices as well as traditional/non-internet-enabled physical machines used in industrial production and/or consumer electronic devices, in order to achieve a more centralized controlling and monitoring mechanism. Conventional firewalls are designed to protect external devices under its protection from potential cyber attacks by cyber intruders and hackers, and attackers. These firewalls, however, are often not designed or configured to control and/or monitor operations of the various kinds of external devices. Thus, there is a need for a new approach that is capable of enabling the network security devices to not only protect, but also to monitor and control the external devices in a secured environment.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support utilizing security device plugins for external device monitoring and control in a secured environment. First, a plugin that implements one or more functionalities to communicate with and to control operations of an external device is provided to a network security device/appliance (e.g., firewall). The plugin is then loaded to the network security appliance and integrated with a software running on the network security device, wherein the software obtains the functionalities offered by the plugin to communicate with and to control the operations of the external device. A secure communication link is established between the plugin of the network security device and the external device following a communication protocol. The network security device is then configured to issue or receive one or more commands to or from the external device following the communication protocol to monitor and collect information from and/or control operations of the external device remotely.

Figure 1:
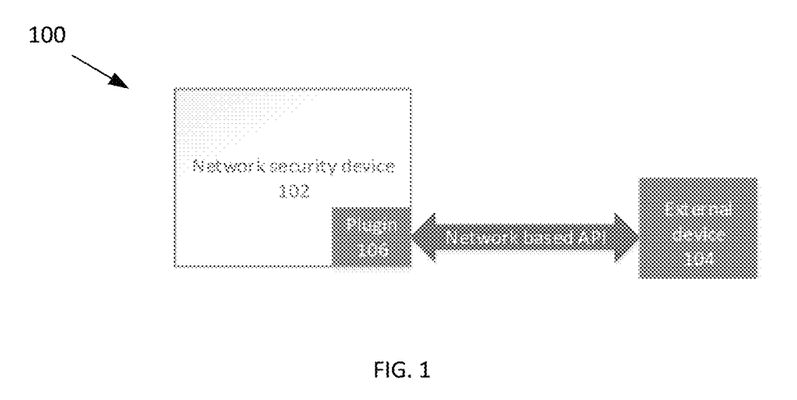
FIG. 1 depicts an example of a system diagram to support utilizing security device plugins for external device monitoring and control in a secured environment in accordance with some embodiments.

Under the proposed approach, the plugin provided to and loaded to the network security appliance enables a network security device which is otherwise unaware of the status and/or operation of the external device to be able to react to events happening to the external device in a predefined and orderly manner. By enabling the network security device to interact with the external device via a two-way communication link, the proposed approach can not only, for a non-limiting example, protect the external device against various kinds of cyber attacks like a conventional firewall, it can also monitor and control the external device to perform certain operations in response to the cyber attacks. In addition, the two-way communication enables any participating device to control another (not limited to a network security device controlling an external device) as specified by the rules and configuration of the plugin/and or devices FIG. 1 depict an example of a system diagram to support utilizing security device plugins for external device monitoring and control in a secured environment. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a network security device 102 having a plugin 106, and an external device 104. Here, the network security device 102 can be but is not limited to a firewall, which can be a dedicated hardware appliance and/or software running on a computing device, a communication device, or any electronic device capable of running a software component. For non-limiting examples, the computing device and/or the communication device can be but is not limited to a laptop PC, a desktop PC, an iPod, an iPhone, an iPad, a Google's Android device, or a server/host/machine. In some embodiments, the network security device 102 may include one or more microprocessors and on-chip memory units storing software instructions of the software component programmed by a user. When loaded into and executed by the microprocessors, the software instructions are configured to perform and implement various functionalities on the network security device 102. In some embodiments, the external device 104 can be an industrial IoT device, which can be but is not limited to a physical machine, e.g., a robot, used in an industrial or consumer setting.

In the example of FIG. 1, the network security device 102 resides either locally or remotely (e.g., over a network) from the external device 104. In some embodiments, the external device 104 is network-enabled (e.g., REST and/or HTTP capable) with an REST and/or HTTP Application Program Interface (API) available for direct bi-directional communication with the network security device 102 over a network, wherein each of the devices is capable of receiving requests/commands from and/or issuing commands/requests to the other device. In some embodiments, the network security device 102 is configured to communicate with the network-enabled external device 104 via its plugin 104 following certain communication protocols, including but not limited to, REpresentational State Transfer (REST) protocol, HTTP or HTTPS protocols, or a proprietary communication protocol, over one or more communication networks (not shown). The communication networks can be but are not limited to, Internet, intranet, wide area network (WAN), local area network (LAN), wireless network, Bluetooth, WiFi, and mobile communication network. The physical connections of the network and the communication protocols are well known to those of skill in the art.

In the example of FIG. 1, the network security device 102 is configured to inspect network traffic/communications originated from the outside network and directed towards the external device 104 protected by the network security device 102, and to detect and block various cyber attacks against the external device 104. Here, the cyber attacks include but are not limited to viruses, hacking attempts, phishing attacks, and other forms of threats. In some embodiments, if a cyber-attack against the external device 104 is detected, the network security device 102 is further configured to communicate with and/or control the external device 104 directly via the plugin 106 to perform certain operations in response to the cyber attacks as discussed below.

In the example of FIG. 1, the plugin 106 is a piece of software implementing one or more functionalities that enable the network security device 102 to communicate with and control (or to be controlled by) the external device 104. Here, the plugin 106 is created and provided by the manufacturer, user, or owner of either the network security device 102 and/or the external device 104. In some embodiments, the plugin 106 is loaded to and installed on the network security device 102 over a network or installed manually as a software package. The plugin 106 is then further integrated with the existing software component running on the network security device 102. As a result of such integration, the network security device 102 is now able to communicate with external device 104 via the plugin 106, wherein, in some embodiments, the plugin 106 is configured to invoke network-based APIs of the external device 104 to establish bi-directional communication between the network security device 102 and the external device 104.

In some embodiments, the plugin 106 is configured to encrypt and decrypt the communication between the network security device 102 and the external device 104 using a pair of public/private key and/or another comparable mechanism to establish a secure/trusted communication link between the two devices involved in such communication. In some embodiments, the plugin 106 introduces an additional user interface to the network security device 102 on which it is installed, which can be either a graphical user interface (GUI) or a command line interface. In the cases where the network security device 102 uses certain variables that contain networks, network addresses, ports etc. for handling traffic and traffic types called "objects," the installation of the plugin 106 provides additional traffic objects and/or new device objects for further optimization of traffic handling for the external device 104 the plugin 106 is created for.

In some embodiments, the network security device 102 is configured to monitor the current status of the external device 104 and/or collect information from the external device 104 by invoking the APIs of the external device 104 via the plugin 106 once the communication between the network security device 102 and the external device 104 has been established. Here, the status and/or information of the external device 104 includes but is not limited to various statistics or stats of the external device 104 currently in operation. The network security device 102 may then determine if any action would be necessary based on the collected stats of the external device 104. If so, the network security device 102 is further configured to control operations of the external device 104 by issuing one or more control instructions/commands to the external device 104 via the plugin 106. Here, the operations include but are not limited to, adjusting one or more settings and/or configurations of the external device 104, shutting down or restarting the external device 104, temporarily separating the external device 104 from rest of the network, etc. In some embodiments, the network security device 102 and/or the plugin 106 is configured to enforce a control policy that specifies a set of control commands allowed for controlling the external device 104 from any other device in the network. In some embodiment, the commands issued by the network security device 102 and the operations/actions taken by the external device 104 as a result of executing the commands can be pre-defined, configured, and customized by the network security device 102 and the external device 104 as long as such commands and operations are agreed upon by both parties and are feasible to create and executable by the parties.

In some embodiments, the external device 104 is configured to communicate with the network security device 102 to make certain request(s) to the network security device 102 following the communication protocol between the two via the plugin 106. For non-limiting examples, the external device 104 may report execution results of the control commands back to the network security device 102, report an abnormal situation happening to the external device 104, or preemptively request the network security device 102 to take certain operations or actions, e.g., to cut the external device 104 off from the rest of the network. In some embodiments. the network security device 102 and/or the plugin 106 is configured to enforce a control policy that limits types of requests and/or operations allowed for controlling the network security device 102 via the external device 104.

Figure 2:
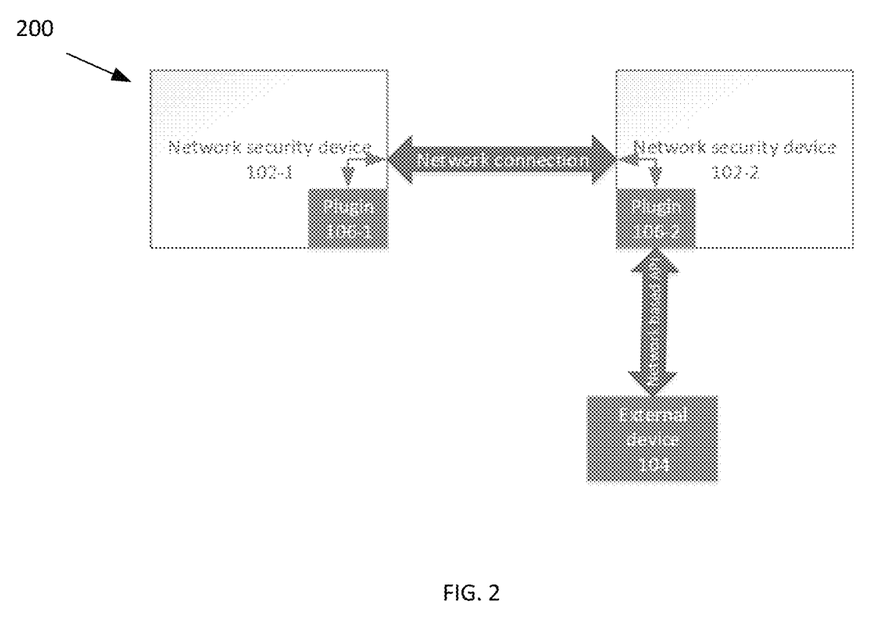
FIG. 2 depicts an example of a system diagram where one network security device utilizes another network security device as a relay to remotely control the external device in accordance with some embodiments.

In some embodiments, the network security device 102 is not only configured to communicate with and control the external device 104 directly connected/attached to it via the plugin 106 in a point-to-point connection, it is also configured to relay the control functionalities of the external device 104 to another network security device also provided with a plugin needed to control the external device 104. FIG. 2 depicts an example of a system diagram where one network security device 102-1 utilizes another network security device 102-2 as a relay to remotely control the external device 104. Each of the network security devices 102-1 and 102-2 has a plugin 106-1 and 106-2 have communication and control functionalities loaded and integrated with it, respectively. In the example of FIG. 2, the network security device 102-1 and the network security device 102-2 first establishes a network connection between them via their respective plugins 106-1 and 106-2. The plugin 106-1 on the network security device 102-1 is then configured to issue a control command to the external device 104 through the network security device 102-2, wherein plugin 106-2 on the network security device 102-2 acts as a relay for control command and sends the control command to the external device 104 associated with and/or attached to the network security device 102-2 by invoking its network-based API. As such, the network security device 102-1 is configured to remotely collect information from and control operations of the external device 104 not directly connected to it.

Figure 3A:
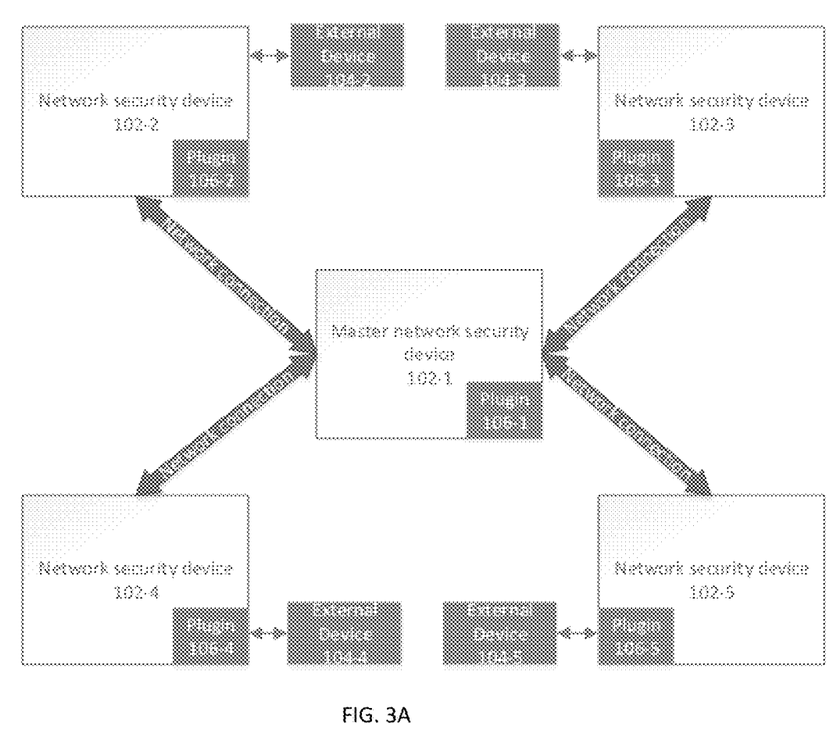
FIGS. 3A-3B depict examples of a star-shaped and a mesh-shaped network, respectively, in accordance with some embodiments.
Figure 3B:
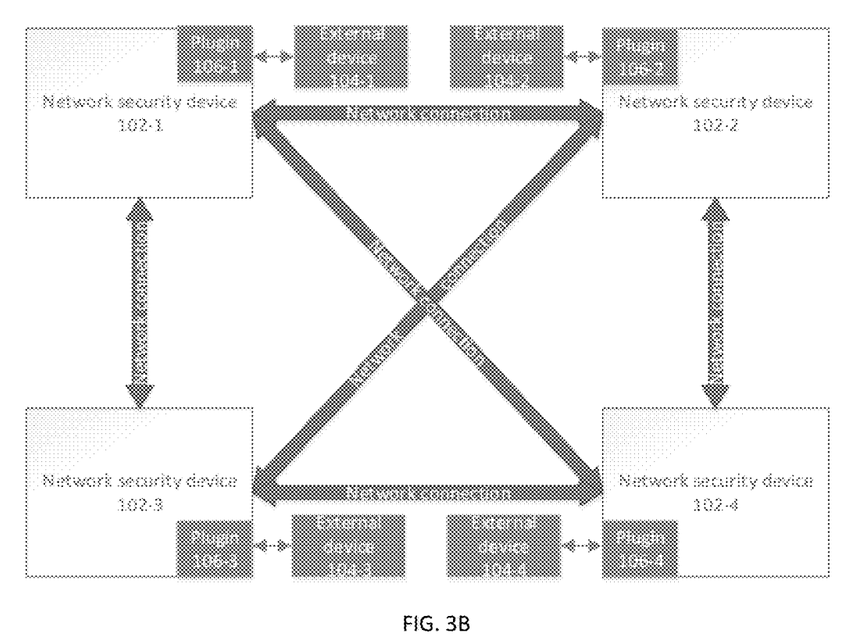

The principle as demonstrated by the example of FIG. 2 allows a configuration of a larger system comprising of multiple external devices to be controlled indirectly from a central point/master network security device, wherein the central network security device connects to a plurality of distributed network security device loaded with plugins and each controlling one of the external devices. The resulting control infrastructure therefore can be a combination of one or more of a point-to-point connection, a star-shaped network, and a mesh-shaped network. FIG. 3A depicts an example of a star-shaped control network wherein master network security device 102-1 has point-to-point network connections with four other network security devices 102-2, 102-3, 102-4, and 102-5, which in turn connect to external devices 104-2, 104-3, 104-4, and 104-5 via their plugins 106-2, 106-3, 106-4, and 106-5, respectively. The master network security device 102-1 provides control commands to these other network security devices via its plugin 106-1, wherein the plugins loaded on those other network security devices relay the control commands to their respectively connected external devices. FIG. 3B depicts an example of a mesh-shaped control network wherein each of the four network security devices 102-1, 102-2, 102-3, and 102-4 has point-to-point network connections with other network security devices as well as with an associated external device. Here, each of the network security devices is not only configured to control the external device attached to it directly, it is also configured to indirectly control those external devices attached to other network security devices via their respective plugins. Such configuration ensures that each of the external devices is still accessible and controllable by one or more of the other network security devices even when the network security device it attaches to is down or otherwise unavailable.

Figure 4:
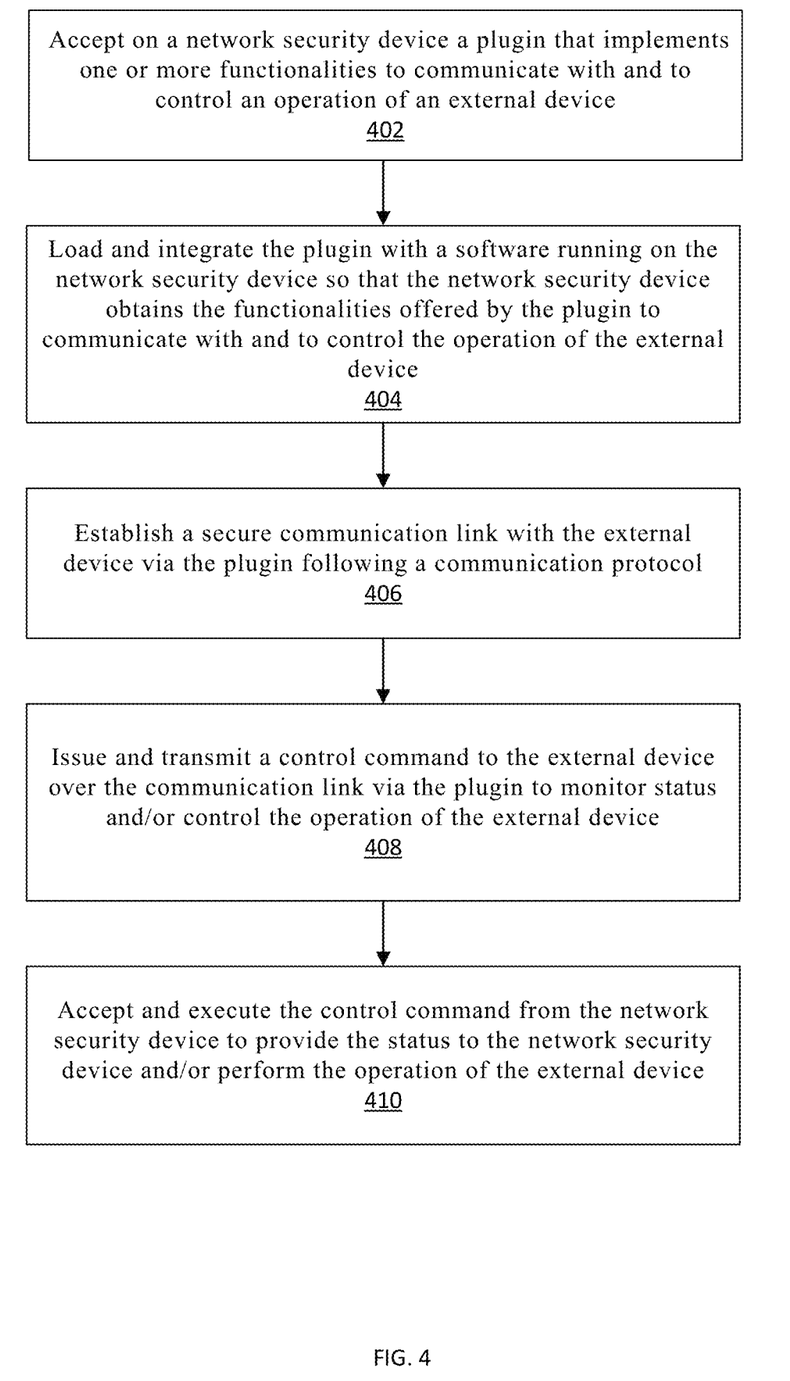
FIG. 4 depicts a flowchart of an example of a process to support utilizing security device plugins for external device monitoring and control in a secured environment in accordance with some embodiments.

FIG. 4 depicts a flowchart 400 of an example of a process to support utilizing security device plugins for external device monitoring and control in a secured environment. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 4, the flowchart 400 starts at block 402, where a plugin that implements one or more functionalities to communicate with and to control operations of the external device is accepted by a network security device. The flowchart 400 continues to block 404, where the plugin is loaded to the network security device and integrated with a software running on the network security device so that the network security device obtains the functionalities offered by the plugin to communicate with and to control the operations of the external device. The flowchart 400 continues to block 406, where a secure communication link is established with the external device via the plugin on the network security device following a communication protocol. The flowchart 400 continues to block 408 where a control command is issued and transmitted via the plugin to the external device over the communication link to monitor status and/or control an operation of the external device. The flowchart 400 ends at block 410 where the control command is accepted and executed by the external device to provide the status to the network security device and/or perform the operation of the external device.

Figure 5A:
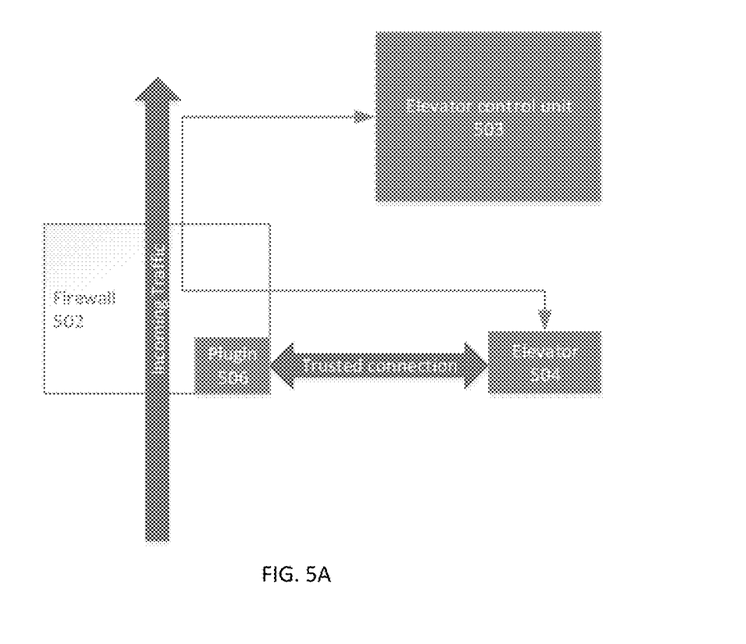
FIGS. 5A-5D depict an example of a so-called "smart elevator" protected and controlled by a firewall using the security device plugins in accordance with some embodiments.
Figure 5B:
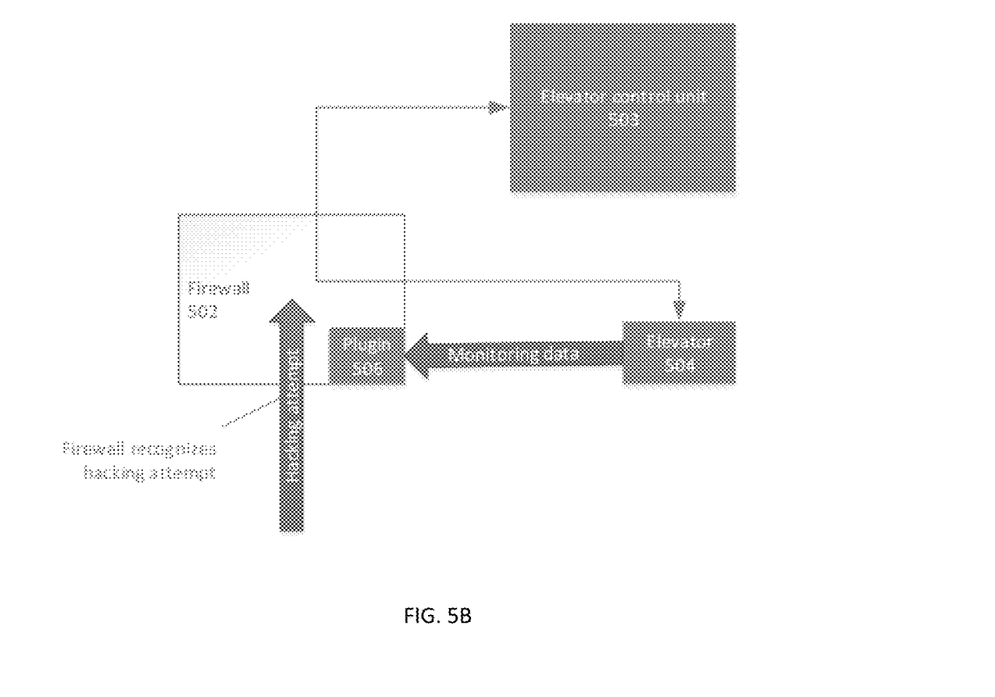
Figure 5C:
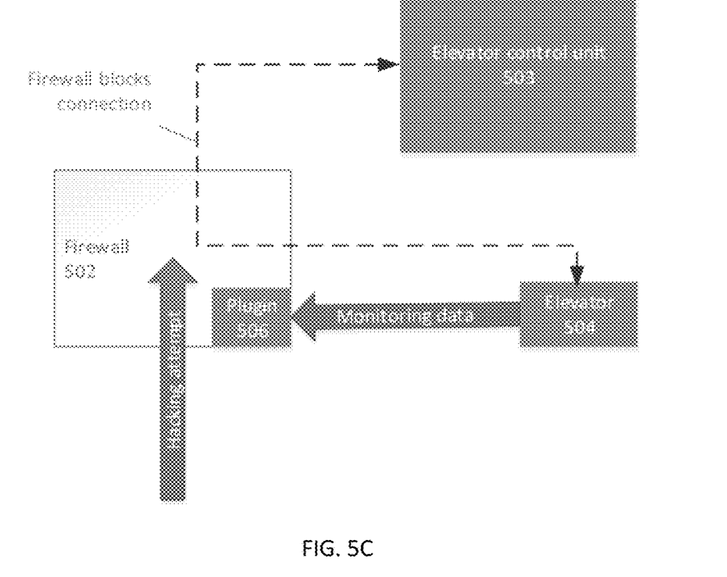
Figure 5D:
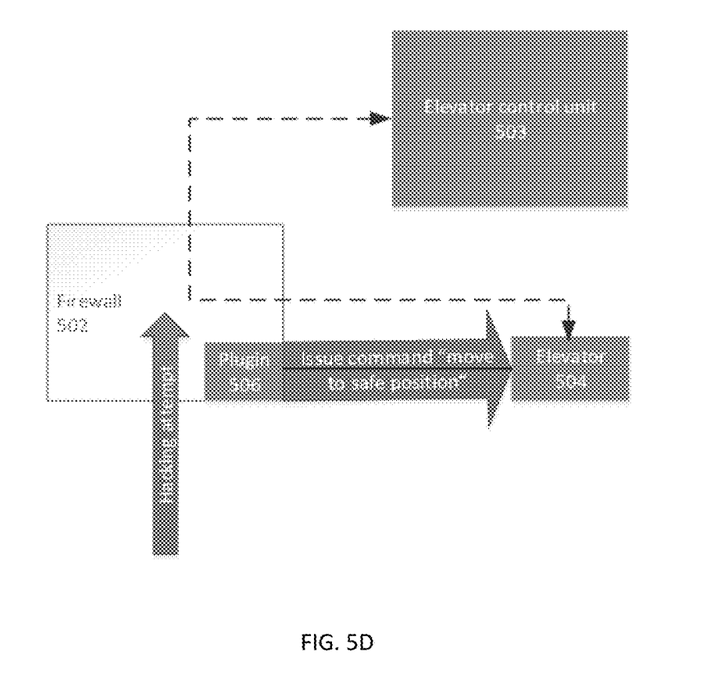

FIGS. 5A-5D depict an example of a so-called "smart elevator" protected and controlled by a firewall using the security device plugins described above. As depicted in FIG. 5A, a smart elevator 504 is typically controlled by an elevator control unit 503 within or external to a company, wherein the traffic from the elevator control unit 503 for controlling the elevator 504 passes through a network security device 502, e.g., a firewall, which also monitors regular incoming network traffic into the company. In the current example, the firewall 502 uses a plugin 506, which provides the firewall 502 with abilities to establish a trusted connection with and control the elevator 504. During its operation, the firewall 502 may detect a hacking attempt from outside network (e.g., the Internet) to the devices within the company as shown in FIG. 5B. Since the elevator 504 has no way of knowing about the hacking attack, and the elevator control unit 503 might have been the target of the hacking attack itself, the firewall 502 interrupts and blocks the connection between the elevator control unit 503 and the elevator 504 in order to avoid the hacking attack resulting in any potential harmful and/or abnormal operation of the elevator 503 as shown in FIG. 5C. In the meantime, the firewall 502 begins to collect and monitor operation status data from the elevator 504 via its plugin 506. since the plugin 506 is equipped with various pre-defined commands to communicate with and control the elevator 504, the plugin 506 may further a control commands to the elevator 504 to move the elevator into a safe state with the need to utilize the potentially compromised elevator control unit 503.

Figure 6A:
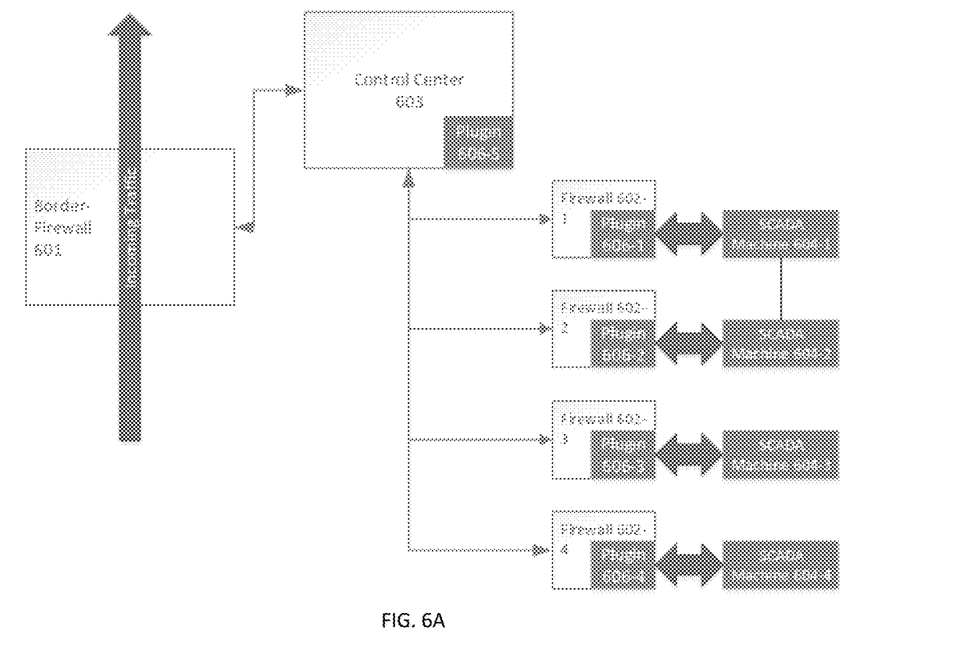
FIGS. 6A-6C depict an example of a setup for a large entity having a device control center and a plurality of network security devices or firewalls deployed to control devices using the security device plugins in accordance with some embodiments.
Figure 6B:
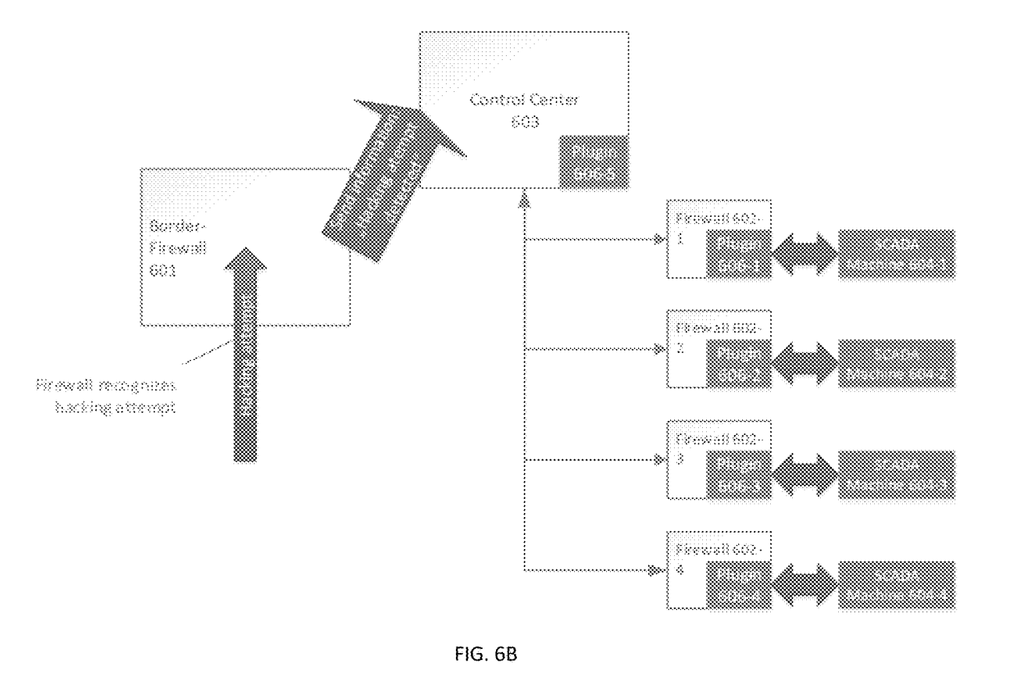
Figure 6C:
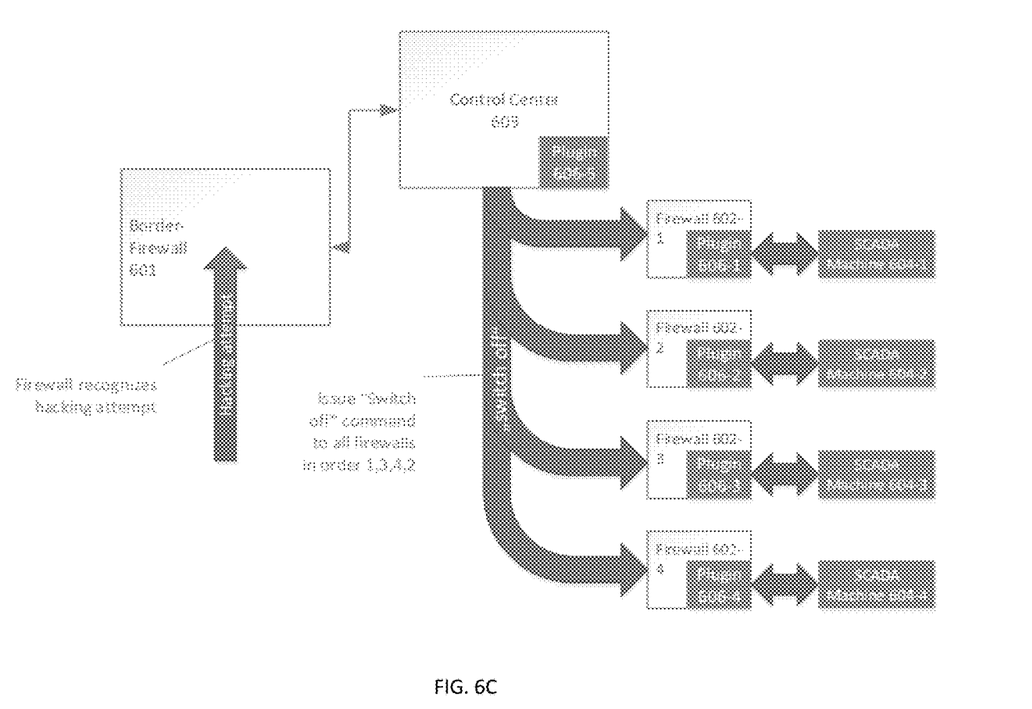

FIGS. 6A-6C depict an example of a setup for a large entity having a device control center and a plurality of network security devices or firewalls deployed to control devices using the security device plugins described above. As shown by FIG. 6A, the setup includes a border firewall 601 monitoring incoming traffic from the Internet to the company as well as a plurality of firewalls 602-1 to 602-4 protecting and controlling via their respective plugins 606-1 to 606-4, a plurality of industrial machines, e.g., supervisory control and data acquisition (SCADA) controlled manufacturing machines 604-1 to 604-4 located at a production line of the company. All these firewalls are controlled by a control center 603 via its plugin 606-5. When a hacker attacks the company, the border firewall 601 detects the hacking attempt and submits information of the hacking attempt to the control center 603 as shown in FIG. 6B. In the current example, it is assumed that it is the company's policy to shut down its production line when a severe hacking attempt is detected and the shutdown process has to happen in an ordered manner to not damage any of the SCADA machines. Under such assumptions, the control center 603 is configured to instruct, via its plugin 606-5, each of the firewalls 602-1 to 602-4 on what to do (e.g., "switch off the SCADA machine under its control") in the correct order (e.g., in the order of SCADA machine no. 604-1, 3, 4, and 2) to prevent damages to the production line when the hacking attempt is detected. Once the SCADA machines are shut down according to the control commands, they may provide a confirmation of the shutdown to their respective firewalls 602-1 to 602-4 via their respective plugins 604-1 to 604-4.

Figure 7:
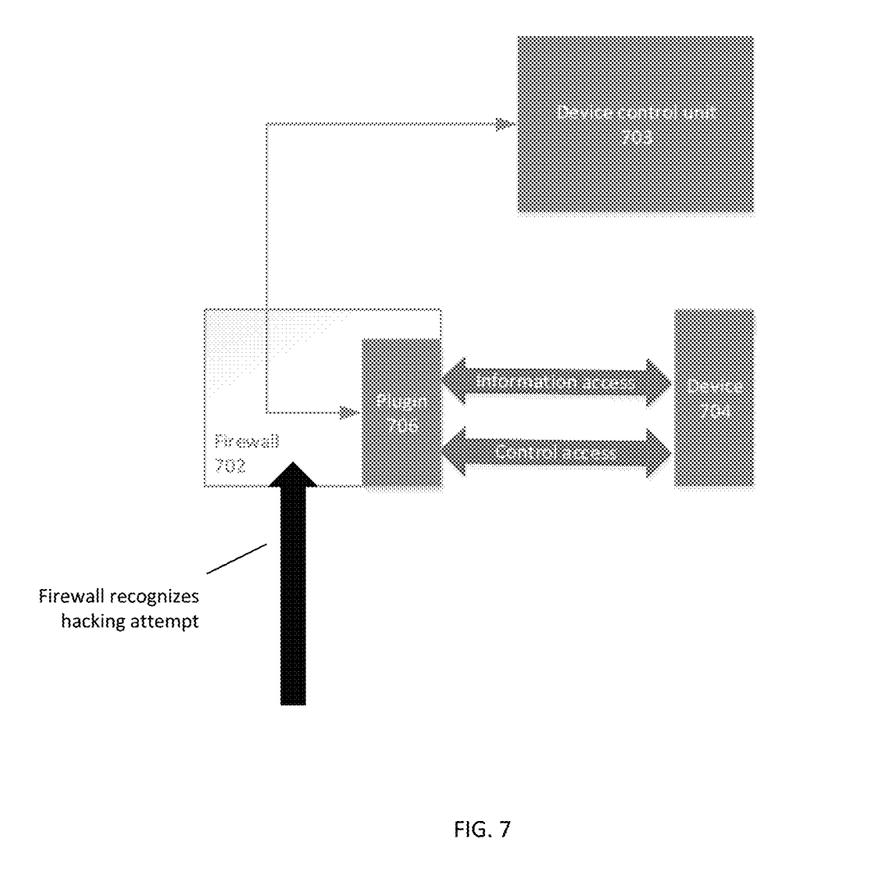
FIG. 7 depicts an example of a system in which the device control unit is only allowed to communicate with the external device under its control via a plugin of a firewall in accordance with some embodiments.

FIG. 7 depicts an example of a system in which the device control unit 703, unlike the example depicted in FIG. 5A-5D, is only allowed to communicate with the external device 704 under its control via firewall 702 through its plugin 706. Here, the plugin 706 is configured to distinguish and separate control traffic (e.g., control commands) from the informational traffic (e.g. status information of the external device 704) exchanged between the device control unit 703 and the external device 704. Once the firewall 702 recognizes a hacking attempt during an attack, the firewall 702 is able to block control access to the external device 704 by the device control unit 703 and only allow informational traffic to pass from the external device 704 to the device control unit 703. Once the control access from the potentially tampered device control unit 703 has been cut off, only the firewall 702 itself is capable of sending control commands to control operations of the external device 704.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system to support utilizing security device plugins for external device monitoring and control in a secured environment, comprising:

a network security device, which:

accepts a plugin that implements one or more functionalities to communicate with and to control an operation of an external device;

loads and integrates the plugin with a software running on the network security device so that the network security device obtains the functionalities offered by the plugin to communicate with and to control the operation of the external device;

establishes a secure communication link with the external device via the plugin following a communication protocol;

issues and transmits a control command to the external device over the communication link via the plugin to monitor status and/or control the operation of the external device;

said external device, which accepts and executes the control command from the network security device to provide the status to the network security device and/or perform the operation of the external device.

2. The system of claim 1, wherein:

the control command issued by the network security device and the operation performed by the external device as a result of executing the control command are pre-defined, configured, and customized by the network security device and the external device.

3. The system of claim 1, wherein:

the operation includes one or more of adjusting one or more settings and/or configurations of the external device, shutting down or restarting the external device, and temporarily separating the external device from a network.

4. The system of claim 1, wherein:

the network security device enforces a control policy that specifies a set of control commands allowed for controlling the external device from any other device in a network.

5. The system of claim 1, wherein:

the network security device inspects network traffic directed towards the external device protected by the network security device to detect and block various cyber attacks.

6. The system of claim 5, wherein:

the network security device communicates with and/or control the external device directly via the plugin to perform the operation in response to the cyber attacks and/or the status to the network security device.

7. The system of claim 1, wherein:
the plugin establishes the communication link between the network security device and the external device by invoking a network-based Application Program Interface (API) of the external device.

8. The system of claim 1, wherein:
the plugin encrypts and decrypts communication over the communication link between the network security device and the external device using a pair of public/private key and/or another comparable mechanism to establish trust between the two devices involved in such communication.

9. The system of claim 1, wherein:
the external device communicates with the network security device to make a certain request to control the network security device via the plugin following the communication protocol.

10. The system of claim 9, wherein:
the network security device accepts and performs one or more operations according to the certain request received from the external device via the plugin.

11. The system of claim 9, wherein:
the network security device enforces a control policy that limits types of requests and/or operations allowed for controlling the network security device by the external device.

12. The system of claim 1, wherein:
the plugin distinguishes and separates the control command from the status information of the external device exchanged between the external device and a device control unit.

13. The system of claim 12, wherein:
the network security device blocks control of the external device by the device control unit and only allows the status information of the external device to pass from the external device to the device control unit once a cyber attack is detected;
allows only the network security device to send the control command to control the operation of the external device via the plugin.

14. A system to support utilizing security device plugins for external device monitoring and control in a secured environment, comprising:
a first set of one or more network security devices each of which
loads and integrates a first plugin so that the each of the first set of one or more network security devices obtains the functionalities offered by the first plugin to communicate with a second set of one or more network security devices;
establishes a first communication link with one of the second set of one or more network security devices via the first plugin following a first communication protocol;
issues and transmits a command to the one of the second set of one or more network security devices over the first communication link via the first plugin to monitor status and/or control an operation of an external device associated with the one of the second set of one or more network security devices;
said second set of one or more network security devices each of which
loads and integrates a second plugin so that the each of the second set of one or more network security devices obtains the functionalities offered by the second plugin to communicate with and control said external device;
establishes a second communication link with said external device via the second plugin following a second communication protocol;
accepts and relays the command from one of the first set of one or more network security devices to the external device over the second communication link via the second plugin to monitor status and/or control the operation of the external device remotely;
said external device accepts and executes the control command relayed from the one of the second set of one or more network security devices to provide the status to the one of the first set of one or more network security devices and/or perform the operation of the external device.

15. The system of claim 14, wherein:
at least some of the first set of one or more network security devices are also in the second set of one or more network security devices.

16. The system of claim 15, wherein:
each of the first and second set of one or more network security devices has point-to-point network connections with other network security devices as well as with an associated external device to form in a mesh-shaped control network.

17. The system of claim 14, wherein:
one of the first set of one or more network security devices serves as a master network security device and monitors status and/or control operations of a plurality of external devices remotely by issuing commands to the second set of one or more network security devices via their respective plugins.

18. The system of claim 17, wherein:
the master network security device has point-to-point network connections with the second set of one or more network security devices, which in turn connect to the plurality of external devices via their plugins, respectively, in a start-shaped control network.

19. A computer-implemented method to support security device plugins for external device monitoring and control in a secured environment, comprising:
accepting on a network security device a plugin that implements one or more functionalities to communicate with and to control an operation of an external device;
loading and integrating the plugin with a software running on the network security device so that the network security device obtains the functionalities offered by the plugin to communicate with and to control the operation of the external device;
establishing a secure communication link with the external device via the plugin following a communication protocol;
issuing and transmitting a control command to the external device over the communication link via the plugin to monitor status and/or control the operation of the external device;
accepting and executing the control command from the network security device to provide the status to the network security device and/or perform the operation of the external device.

20. The method of claim 19, further comprising:
pre-defining, configuring, and customizing the control command issued by the network security device and the operation performed by the external device as a result of executing the control command.

21. The method of claim 18, further comprising:
enforcing a control policy that specifies a set of control commands allowed for controlling the external device from any other device in a network.

22. The method of claim 19, further comprising:
inspecting network traffic directed towards the external device protected by the network security device to detect and block various cyber attacks.

23. The method of claim 22, further comprising:
communicating with and/or control the external device directly via the plugin to perform the operation in response to the cyber attacks and/or the status to the network security device.

24. The method of claim 19, further comprising:
establishing the communication link between the network security device and the external device by invoking a network-based Application Program Interface (API) of the external device.

25. The method of claim 19, further comprising:
encrypting and decrypting communication over the communication link between the network security device and the external device using a pair of public/private key and/or another comparable mechanism to establish trust between the two devices involved in such communication.

26. The method of claim 19, further comprising:
communicating with the network security device to make a certain request to control the network security device via the plugin following the communication protocol.

27. The method of claim 26, further comprising:
accepting and performing one or more operations according to the certain request received from the external device via the plugin.

28. The method of claim 26, further comprising:
enforcing a control policy that limits types of requests and/or operations allowed for controlling the network security device by the external device.

29. The method of claim 19, further comprising:
distinguishing and separating the control command from the status information of the external device exchanged between the external device and a device control unit.

30. The method of claim 29, further comprising:
blocking control of the external device by the device control unit and only allowing the status information of the external device to pass from the external device to the device control unit once a cyber attack is detected;
allowing only the network security device to send the control command to control the operation of the external device via the plugin.

31. A computer-implemented method to utilizing security device plugins for external device monitoring and control in a secured environment, comprising:
loading and integrating a first plugin on each of a first set of one or more network security devices so that the each of the first set of one or more network security devices obtains the functionalities offered by the first plugin to communicate with a second set of one or more network security devices;
establishing a first communication link with one of the second set of one or more network security devices via the first plugin following a first communication protocol;
issuing and transmitting a command to the one of the second set of one or more network security devices over the first communication link via the first plugin to monitor status and/or control an operation of an external device associated with the one of the second set of one or more network security devices;
loading and integrating a second plugin on each of said second set of one or more network security devices so that the each of the second set of one or more network security devices obtains the functionalities offered by the second plugin to communicate with and control said external device;
establishing a second communication link with said external device via the second plugin following a second communication protocol;
accepting and relaying the command from one of the first set of one or more network security devices to the external device over the second communication link via the second plugin to monitor status and/or control the operation of the external device remotely;
accepting and executing the control command relayed from the one of the second set of one or more network security devices to provide the status to the one of the first set of one or more network security devices and/or perform the operation of the external device.

* * * * *